Figure 4:
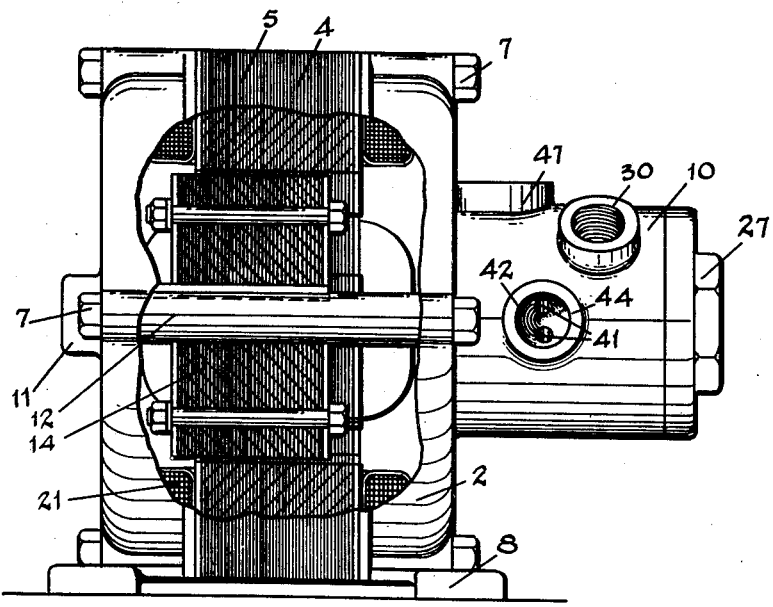

Aug. 16, 1938.    W. H. MARTIN    2,127,265
ROTATIVE SLIDE VALVE
Filed June 23, 1937    3 Sheets-Sheet 1
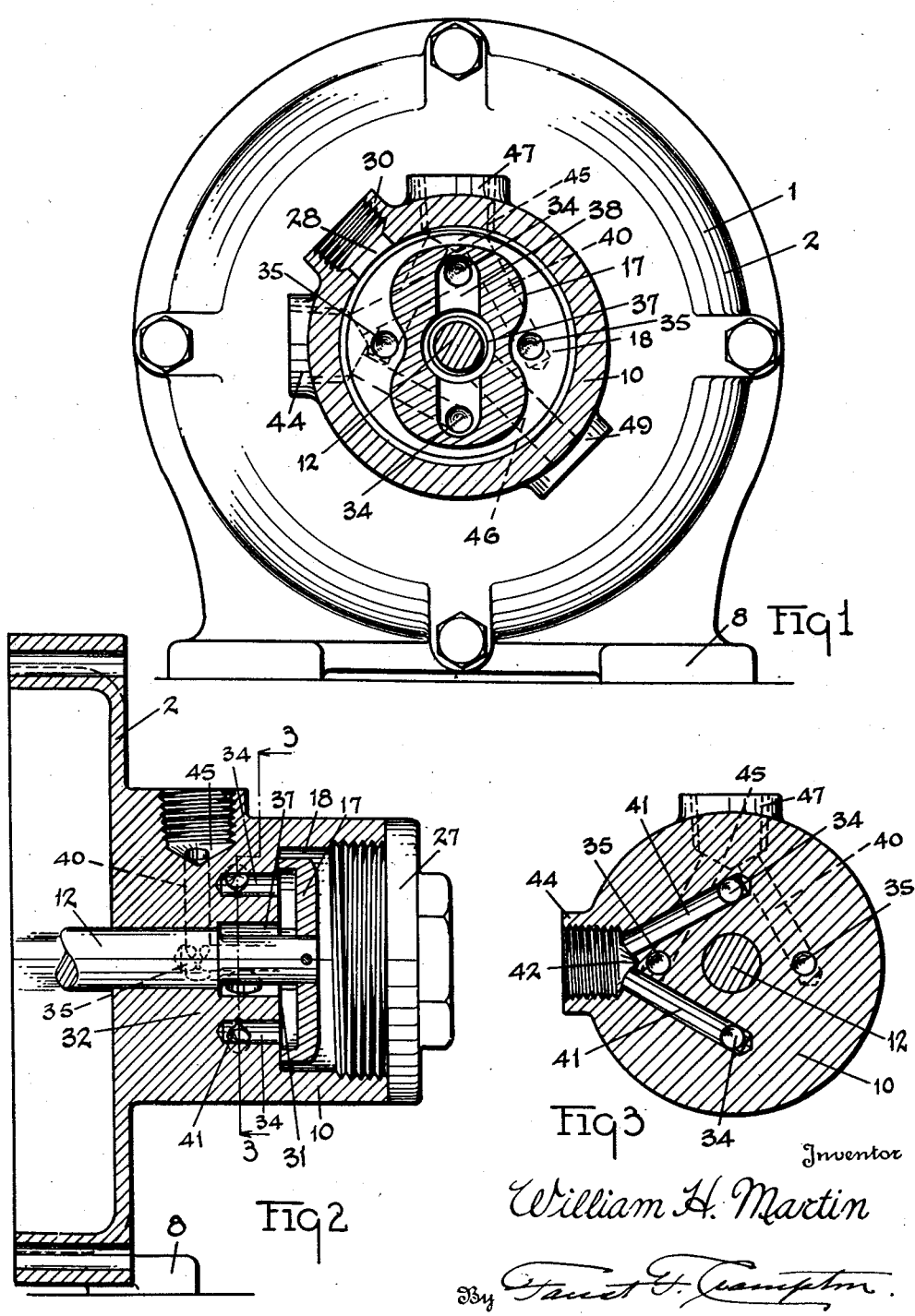
Inventor
William H. Martin
By Faust F. Crampton
Attorney Aug. 16, 1938. W. H. MARTIN 2,127,265
ROTATIVE SLIDE VALVE
Filed June 23, 1937 3 Sheets-Sheet 2

Inventor
William H. Martin
By Faust F. Crampton
Attorney

Aug. 16, 1938.  W. H. MARTIN  2,127,265
ROTATIVE SLIDE VALVE
Filed June 23, 1937  3 Sheets-Sheet 3
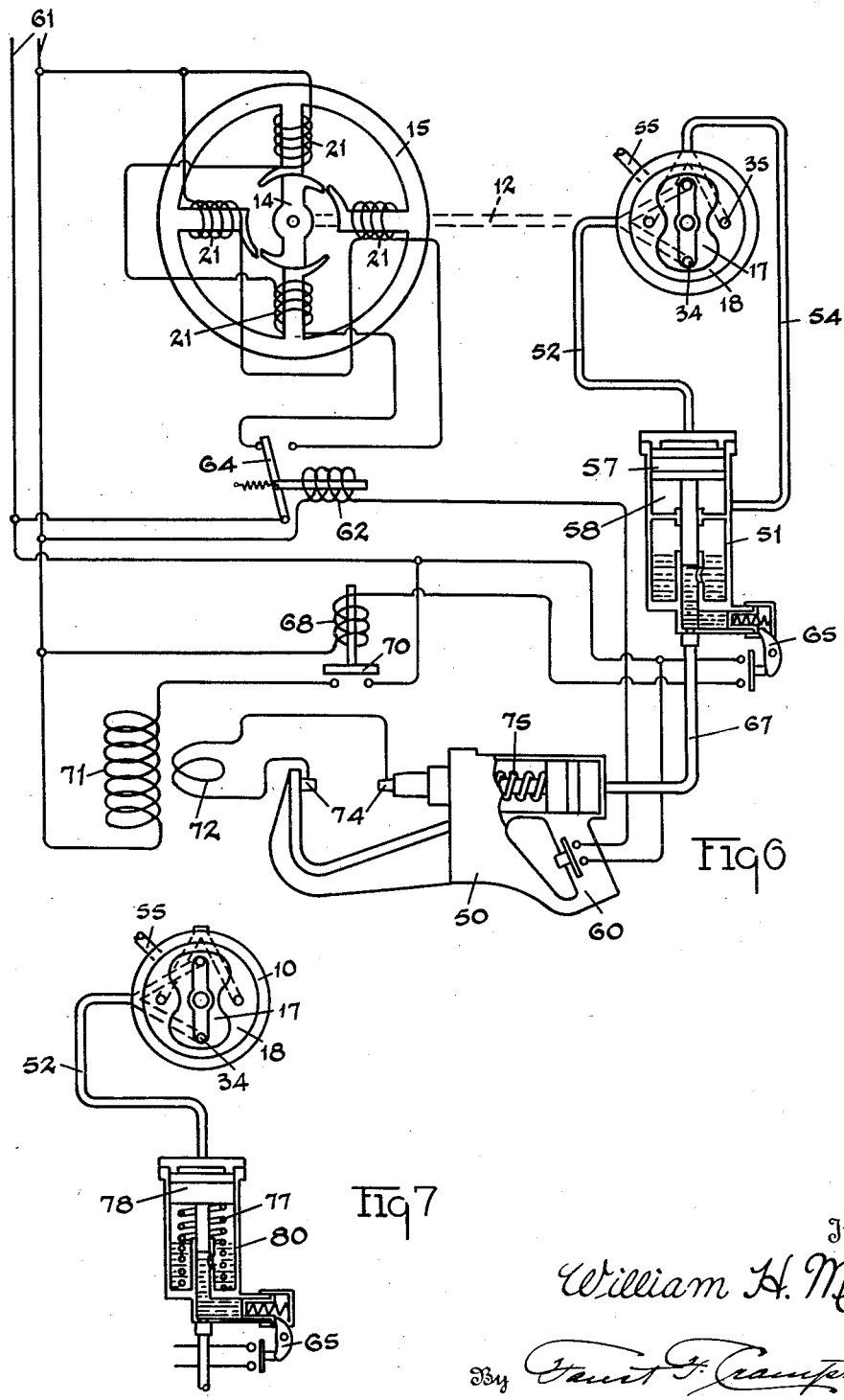
Inventor
William H. Martin
By [signature]
Attorney Patented Aug. 16, 1938

2,127,265

UNITED STATES PATENT OFFICE 2,127,265

ROTATIVE SLIDE VALVE

William H. Martin, Pleasant Ridge, Mich.

Application June 23, 1937, Serial No. 149,938

2 Claims. (Cl. 137—139)

My invention has for its object to provide a slide valve having a small light weight rotatable member that is operable by a light force and slight movement for controlling flow of a fluid under pressure. The invention is of particular value when used in connection with welders, riveters and the like which require the rapid transmission of a high pressure or the transmission of a rapidly pulsating pressure and also for remotely controlling the flow of fluid or the transmission of fluid pressures in connection with devices of various forms.

The invention also has for its object to eliminate all hammering of movable valve members that commonly occur in reciprocating or oscillating valves and particularly in spring-pressed valves. By my invention, the movable valve member is held in constant contact with a coacting sealing surface by the pressure of the fluid of the source of supply of fluid pressure that is controlled by the valve and all pressure-sealing springs are eliminated.

The invention also provides a means for sealing the passageway communicating with the low- and high-pressure sides of the rotatable valve member, its connecting drive element and the bearing parts by the pressure of the fluid controlled by the valve.

The invention also provides means for counteracting the sealing pressure during movement of the valve member for reducing the sliding friction of the movable valve member by reduction of the contacting surface pressure.

The invention provides an electromagnetic rotative member operable to rotate the valve step by step to alternately or sequentially open and close one or more ports and electromagnetically limit the movements to produce succeeding port and passageway registration.

The invention consists in other features which will appear from the following description and upon examination of the drawings forming a part hereof. Structures containing the invention may partake of different forms and may be varied in their details and still embody the invention. To illustrate a practical application of the invention, I have selected a slide valve as an example of the various structures that contain the invention and shall describe the selected structure hereinafter, it being understood that certain features of my invention may be used to advantage without a corresponding use of other features of the invention and without departing from the spirit of the invention as presented in the claims. The particular structure selected is shown in the accompanying drawings.

Figure 5:
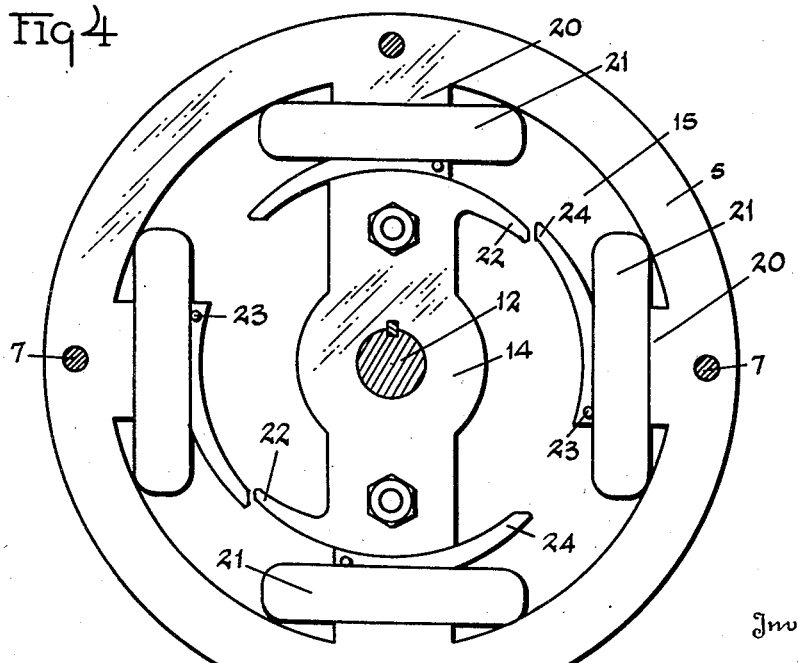

Fig. 1 illustrates a view of a section of the valve. Fig. 2 illustrates a section of a cap plate in which the valve is mounted. Fig. 3 illustrates a view of a section taken on the plane of the line 3—3 indicated in Fig. 2. Fig. 4 illustrates a side broken view of the valve. Fig. 5 illustrates the elctromagnetic means for actuating the valve. Fig. 6 is a diagram illustrating the connections of the valve with a welder. Fig. 7 illustrates a modified form of the apparatus indicated in the diagram shown in Fig. 6.

In the particular form of construction illustrated in the drawings, the valve comprises a rotative slide valve member and an electromagnetic means for actuating the member to produce step by step or periodic movements of the valve member and electromagnetically locate or register the valve member with respect to the ports or openings through which fluid may pass or its pressure be transmitted. The valve is contained within a shell 1 comprising end shields or covers 2 located on the sides of a laminated ring 4 forming the stator 5. The end covers 2 are secured by means of bolts 7 to the ring 4. The end covers 2 are provided with projecting parts 8 that form a base for supporting the valve. The end shields or covers 2 are also provided with bosses or hubs 10 and 11 that afford bearing parts for the shaft 12 of the rotor 14 located within the chamber 15 formed by the enclosing covers 2. The shaft 12 is connected to a valve member 17 located in a chamber 18 formed in the boss or hub 10 and is rotatively moved by the motor means.

The stator 5 of the electromagnetic motor means is provided with a plurality of inwardly extending poles 20 surrounded by coils 21 for magnetizing the poles. The coils 21 may be secured in position on the poles by means of pins 23. The coils 21 located on diametrically oppositely disposed poles, are simultaneously connected in an electric circuit to establish a field between the poles. The number of pairs of poles formed on the stator may be varied to correspond to the number of positions in which it is desired to locate the valve member to produce port registration.

The rotor 14 is provided with pole parts 22 that may extend curvedly in either or both directions with respect to the axis of the shaft 12. Also, the poles 20 of the stator may be provided with protruding pole parts 24 that may extend curvedly in either or both directions with respect to the axis of the shaft 12, to subject the rotor to the fields of contiguous poles of the stator when the poles with which the stator is aligned become de-energized and the contiguous poles become energized. In the particular form of construction shown, the pole parts 22 extend arcuately in one direction while the pole parts 24 extend arcuately in the other direction to substantially bridge the spaces between the contiguous poles toward which the stator is to be progressively advanced. The pole parts initiate the movements of the rotor 14 upon the sequential energization of each of the pairs of poles. Where the pole parts 22 and 24 extend in both directions and the stator is provided with more than two pairs of poles, rotation of the rotor and the valve member may be produced periodically in either direction, depending upon the sequential energization of the poles as produced by the flow of current through the coils 21 of such poles.

The valve member 17 is formed to tightly fit the end of the shaft 12 to which the rotor is also secured. The shaft 12 extends through the wall located intermediate the chambers 15 and 18. The chamber 18 is closed by a plug 27 and a source of supply of fluid under pressure is connected to the chamber 18 through an opening 28 formed in a threaded boss 30 located in a side wall of the chamber and at a point at one side of the valve member 17. The fluid pressure operates to press the valve member 17 against the surface part 31 of the wall 32 of the chamber 18. The wall 32 is provided with ports 34, 35 and 37 formed within the area of the surface 31 over which the valve member 17 slidably moves.

The valve member 17 is a relatively small member having a recess 38 and edge parts 40. The recess 38 establishes connection between one or more of the ports in the wall 32 as the member connects other of the ports in the wall 32 with the chamber 18. Preferably, the valve member 17 is so shaped as to disconnect certain of the said ports with the chamber in advance of establishing connection of other of the ports with the chamber. Thus, as illustrated in Fig. 1, the outline of the movable valve member conforms substantially to a figure eight. The recess 38 has parallel sides that extend diametrically with respect to the shaft 12 whereby the ports 34 may be connected to the port 37 and the ports 35 may be connected to the chamber 18 when the rotor 14 is located in one position with respect to the stator 5 and when the member is moved by the rotor 14 the edge portions 40 of the valve member 17 operate to disconnect the ports 35 from the chamber 18 and then to connect them with the port 37 as the ports 34 are connected with the chamber. The shaft 12 extends through the port 37. Thus, in the form of construction shown, the valve is rotated step by step to produce alternate connections with the pairs of ports 34 and 35 and alternate connections of each pair of the said ports with the port 37 and the chamber 18.

Where the ports in the wall 32 are arranged in pairs, the ports of each pair may be connected together by suitable passageways, such as the passageways 41. The ports 34 are connected by the passageways 41 to an opening 42 formed in a threaded boss 44 located on a side wall of the hub 10 while the ports 35 are also connected by the passageways 41 with an opening 45 formed in a threaded boss 47 also located on the side wall of the hub 10. The port 37 is connected by a passageway 46 to an opening formed in a threaded boss 49 for the discharge of the fluid controlled by the valve.

The ports and passageways closed by the valve member are sealed against entrance of the fluid from the chamber 18 by the fluid pressure that forces the edge of the valve member against the surface 31 of the wall 32. The bearing surfaces that rotatably support the shaft are likewise sealed against the escape of fluid from the chamber 18.

The magnetization of the poles will not only cause a quick responsive rotative movement of the rotor and the valve member, but also will bring the parts to a quick stop upon alignment of the stator with the energized poles and registration of the valve member with the ports. The magnetizing flux produces a shock absorbing reactive force to prevent movement beyond the required fixed limitation and without any jarring or pounding as commonly occurs in connection with oscillating or reciprocating valves.

The shaft 12, being connected to the valve member 17 which is subjected to the pressure of the fluid in the chamber 18, is, together with the valve member 17, pressed outwardly with respect to the interior of the chamber. In order to reduce the contact pressure of the valve member 17 against the surface 31 of the wall 32 and to greatly reduce the friction and resistance to movement of the valve member by the rotor, the electromagnetic means not only operates to rotate the valve member but also to counteract the pressure of the fluid on the valve member and greatly reduce the frictional contact pressure and, consequently, reduce resistance to movement of the valve member. In the form of construction shown, the rotor 14, which is secured to the shaft 12, is disposed outwardly with respect to the poles 20 and so as to dispose the central plane of the rotor located at right angles to the shaft 12, more remote from the surface 31 of the wall 32, against which the valve member is pressed, than the similar central plane of the poles of the stator is located from the said surface. When the poles of the stator are magnetized, a magnetic force is exerted on the rotor in a direction opposite to that of the fluid pressure on the valve and, consequently, the resultant pressure of the valve member against the surface 31 is greatly reduced which greatly reduces the resistance to the movement of the valve member and the rotor by the field of force created by the flow of the current in the coils 21.

The electromagnetically operated valve member thus may be utilized for rapid and accurate registration of the valve member with respect to its ports to connect hydraulically or pneumatically operated devices with sources of supply of fluid under pressure for controlling the flow of fluid to the devices and wherein all pounding and jarring of the valve member is eliminated and the parts are sealed by pressure of the controlled element of the valve by a high pressure, and yet frictional resistance to movement may be reduced to a desired degree and according to the sealing pressure that may be required during the movement. The valve is of particular value when applied to welders of different forms that necessitate remote control of the fluid and, in their operation, are subject to a number of factors that are dependent upon the fluid pressure, such as the rate of pressure transmission, production of welding pressure of the work, automatic production of flow of welding current and cessation of flow within the period of the welding pressure, and release of the work subsequent to the cessation of the current flow.

In Fig. 6 is indicated diagrammatically the electric and pneumatic connection of the valve to a welding apparatus that is hydraulically operated by the actuation of the pneumatic booster which is controlled by the valve.

A welder 50 is hydraulically connected to a booster 51 which is connected to the valve chamber 18 through the ports 34 and 35 by means of the pipes 52 and 54. A source of supply of air under pressure is directed to the chamber 18 through the pipe 55. A suitable pipe, if desired, may be connected to the port 37 for the discharge of the air that returns through either of the pipes 52 or 54. Thus, the ports 34 and 35 may be designated as the pressure ports of the valve and the port 37 may be designated as the exhaust port. The booster 51 is provided with a piston 57 and the pipes 52 and 54 are connected to the cylinder part 58 at points located on opposite sides of the piston 57. Normally, the pressure of the fluid in the chamber 18 is transmitted through the ports 35 for maintaining the piston 57 in a non-working position with respect to the operations of the welder 50. When the welder 50 is to be operated to engage the work and produce the welds, the valve member 17 is rotated to connect the ports 34 with the chamber 18 and the pressure is transmitted through the pipe 52 to the other side of the piston 57. At the same time, the exhaust port 37 is connected to the ports 35 and the other side of the cylinder is exhausted through the pipe 54 as the piston 57 is moved to hydraulically transmit the pressure exerted on the piston 57 to the welder 50. Upon completion of the weld, the valve member 17 is again moved to connect the ports 34 with the exhaust port 37 which exhausts the cylinder and transmits the fluid pressure through the ports 35 and the pipe 54 to restore the piston 57 to its non-working position.

The valve member is controlled by means of a switch 60 located on the welder 50 that completes a circuit from the source of current that is fed through the main lines 61 to a solenoid 62 and through the switch 60. The switch 60 operates to complete the circuit of the solenoid 62 which operates a switch 64 to open and close the circuits of the coils 21 that surround the poles of the stator. As indicated in the drawings, the coils of the diametrically oppositely disposed poles are connected in series with one of the main lines 61 and the switch 64 is connected to the other of the lines. The switch 64 operates to open one of the pairs of coils and to close the other of the pairs of coils upon closure of the manually operated switch 60 and produce corresponding movement of the rotor 14 and actuate the movable valve member to establish the required connections to the booster 51 and produce the corresponding operations of the booster and the welder.

When the welder engages the work with a pressure to produce a required pressure, suitable means may be provided for immediately and automatically producing flow of the welding current and causing cessation of the flow of the welding current in advance of the release of the welder to prevent arcing at the welding points. The booster may be provided with a suitable switch 65 that may be hydraulically operated by the liquid through which the pressure of the booster is transmitted to the welder and located in a pipe 67. The switch 65 is hydraulically operated to close the circuit of a solenoid 68 that is connected to one of the lines 61, the switch 65 being connected to the other of the lines to complete the circuit of the solenoid 68. The solenoid 68 operates a switch 70 that completes the circuit from the main line 61 through a primary 71 of a transformer. When the current flows through the primary 71 it induces the flow of a current through the secondary 72 that is connected to the welding points 74 of the welder 50.

Immediately upon reduction of the pressure on the piston 57 and in advance of material releasement of pressure of the welding point 74 on the work, the switch 65 is opened which operates to open the switch 70 and cause cessation of the flow of the welding current and upon continued reduction of pressure by the movement of the piston 57, the welding points 74 are separated from the work, such as by the operation of a spring 75. The welder 50 may then be moved to another point along the work and the operations repeated. Thus, the piston 57 of the welder 50 will respond quickly to the operation of the switch 60 on the welder 50 in the control of the welding operation.

If desired, the booster may be provided with a spring for the return of the piston 57, in which case, the passageway leading to the ports 35 may be closed, such as by a suitable plug that may be inserted in the boss 47 and the pipe 54 may be dispensed with. Thus, in the modification of the apparatus as shown in Fig. 7, a spring 77 may be located intermediate the piston 78 of the booster and the lower end of the cylinder 80 for causing the return of the piston 78. The working stroke of the piston 78 is produced by connecting the ports 34 with the chamber 18 as before to cause the transmission of pressure through the pipe 52, as in the form of construction shown in Fig. 6, and upon subsequent actuation of the electromagnetic means the valve member operates to open the ports 34 and permit the transmission of pressure from the chamber 18 to the piston 78 to cause the booster and the welder to perform their working strokes upon operation of the switch 60. Upon release of the switch 60 the switch 64 is returned to connect the other pair of coils of the stator and cause the movable valve member to return to its normal position, whereupon the springs 75 and 77 move the welding points and the piston 57 to their normal positions, the air being exhausted from the booster through the port 37.

I claim:

1. In a valve, an electromagnetic motor means having a stator and a rotor, the valve having a chamber, a valve member located in the chamber and in contact with a wall of the chamber and having a recess, the said wall of the chamber having exhaust and pressure ports, a bearing member extending through the said wall and through the exhaust port and connected to the rotor and the valve member for rotatably supporting the rotor and the valve member, means for introducing fluid under pressure into the chamber and operative to press the valve member against the end wall of the chamber, the central planes of the stator and rotor extending at right angles to their axis and being relatively displaced to simultaneously release the pressure of the valve on the said wall and rotate the rotor and sequentially connect the pressure ports with the chamber and alternately connect each pressure port with the exhaust port and the chamber.

2. In a fluid pressure controlling means, an electromagnetic motor means having a rotor and a stator, the rotor and stator having pole parts, means for intermittently magnetically energizing the rotor and stator to actuate the rotor, end covers having hub bearing parts and connected to the sides of the stator and forming a rotor-enclosing chamber, one of the hub parts having a fluid pressure chamber and a port located in the hub part intermediate the chambers, a valve member located in the hub chamber, means for introducing fluid under pressure into the fluid pressure chamber and operative to press the valve member against the said hub, a rotor shaft rotatably supported in the hubs and connected to the rotor and the valve member, the central plane of the rotor poles located at right angles to the axis of the shaft disposed outwardly with respect to the central plane of the poles of the rotor at right angles to the axis of the shaft and with respect to the valve member for reducing the contact pressure of the valve member when the rotor and the valve member are operated by the stator to periodically open and close the connection of the ports with the chamber.

WILLIAM H. MARTIN.